US00RE36695E

United States Patent [19]

Holt

[11] E Patent Number: Re. 36,695

[45] Reissued Date of Patent: May 16, 2000

[54] CAPTIVE LATCH MECHANISM FOR USE WITH AN EXPANSION CARD CAGE IN A PERSONAL COMPUTER

[75] Inventor: George T. Holt, Round Rock, Tex.

[73] Assignee: Dell U.S.A., L.P., Round Rock, Tex.

[21] Appl. No.: 09/089,748

[22] Filed: Jun. 2, 1998

Related U.S. Patent Documents

Reissue of:

[64] Patent No.: 5,601,349
Issued: Feb. 11, 1997
Appl. No.: 08/507,680
Filed: Jul. 25, 1995

[51] Int. Cl.[7] ..... A47B 47/00

[52] U.S. Cl. ..... 312/265.6; 312/223.2; 312/223.1; 361/683; 361/686; 361/801; 361/726; 439/345; 439/350; 439/327; 174/67

[58] Field of Search ..... 312/265.6, 223.1, 312/223.2, 265.5; 361/683, 686, 801, 726, 759, 747, 740; 439/345, 350, 327, 135; 174/67

[56] References Cited

U.S. PATENT DOCUMENTS

| | | | |
|---|---|---|---|
| 4,227,238 | 10/1980 | Saito | 361/801 |
| 4,585,288 | 4/1986 | Aikens | 439/345 X |
| 4,659,159 | 4/1987 | Takahashi | 439/345 |
| 4,703,396 | 10/1987 | Fletcher | 361/801 X |
| 4,873,395 | 10/1989 | Mast | 174/35 GC |
| 5,004,867 | 4/1991 | Mast | 174/35 GC |
| 5,218,760 | 6/1993 | Colton et al. | 361/683 X |
| 5,228,319 | 7/1993 | Holley et al. | 70/58 |
| 5,317,483 | 5/1994 | Swindler | 361/801 |
| 5,383,793 | 1/1995 | Hsu et al. | 361/801 X |
| 5,398,156 | 3/1995 | Steffes et al. | 361/683 |
| 5,428,507 | 6/1995 | Chatel et al. | 361/801 X |

*Primary Examiner*—Peter M. Cuomo
*Assistant Examiner*—Stephen Vu
*Attorney, Agent, or Firm*—Haynes & Boone, L.L.P.

[57] ABSTRACT

In a computer chassis having a wall, an interiorly-positioned card cage associated with the wall, and the card cage having a card guide slot therein, a card guide retaining device. In a preferred embodiment, the card guide retaining device has a retainer having (1) a first end extending to within the computer chassis through a retainer aperture in the wall, the retainer aperture corresponding to the card guide slot, and (2) a second end extending to without the retainer aperture exterior to the computer chassis. The first end includes a gripping surface to engage and retain a card guide positioned about the card guide slot. The gripping surface may be a generally rectangular planar member extendable over a retaining tab portion of the card guide to thereby secure the card guide against a card guide ledge of the card cage. The second end has a flanged portion to contact an exterior surface of the wall. The retainer may be moved between an engaged position and a disengaged position from the exterior of the computer chassis via the flanged portion. The retainer is configured to provide a retaining force from the wall to the card guide when in the engaged position.

20 Claims, 3 Drawing Sheets

CAPTIVE LATCH MECHANISM FOR USE WITH AN EXPANSION CARD CAGE IN A PERSONAL COMPUTER

Matter enclosed in heavy brackets [ ] appears in the original patent but forms no part of this reissue specification; matter printed in italics indicates the additions made by reissue.

TECHNICAL FIELD OF THE INVENTION

The present invention is directed, in general, to personal computers, and more specifically to a personal computer having a captive latch mechanism associated therewith.

BACKGROUND OF THE INVENTION

Within the interiors of their housings, modem personal computers are customarily provided with sheet metal cage structures adapted to receive and removably support a plurality of option or expansion cards which, when operatively installed in their associated cage structure, upgrade the operating capabilities of the computer. These expansion cards may be installed in the computer during its original manufacture or subsequently installed by the computer purchaser. Typical types of expansion cards include network, sound, graphics accelerator and multi-media cards.

An expansion card is basically a relatively small rectangular printed circuit board having, along one side edge, a connector edge portion that plugs into a corresponding socket portion of the cage structure to operatively couple the installed card to the motherboard or system planar of the computer. The socket portions of the cage structure are relatively oriented in a manner such that the expansion cards installed therein are arranged in a spaced apart, parallel, facing series with end edges of the cards being aligned with one another.

Extending along these aligned end edge portions of the expansion cards are sheet metal connecting brackets having outwardly bent securement tab portions positioned adjacent the side edge portions of the cards opposite their connector edge portions. These tab portions rest upon an inturned side wall ledge of the cage structure and have notches formed therein that overlie and register with a spaced series of threaded circular openings in the ledge. Each bracket tab is removably secured to the ledge by a screw that extends through the tab notch and is threaded into its associated ledge opening. This individual securement of the bracket tabs to the cage structure ledge serves to anchor the installed expansion cards in place within the cage structure, thereby preventing the connector edge portions of the cards from being dislodged from their associated connector sockets during shipping and handling of the computer.

This conventional use of individual screws to removably secure the card bracket tabs to the cage structure carries with it several well known disadvantages. For example, during initial installation of the expansion cards within the cage structure one or more of the retaining screws can easily fall into the typically crowded interior of the computer, thereby creating what may be a difficult retrieval problem. Additionally, when a series of expansion cards are installed at the factory each individual bracket retaining screw is typically installed using an automated assembly machine. Several seconds are required to install each screw, thereby appreciably increasing the overall assembly time for each computer in which expansion cards are to be factory installed.

The use of individual card bracket tab retaining screws also creates potential problems and inconveniences for the purchaser of the computer or technicians that subsequently work on the expansion card portion of the computer. For example, when subsequently adding or exchanging expansion cards, the technician or computer owner must unscrew the bracket tab in place and then reinsert the removed screw into the bracket tab of the added expansion card. Often, more than one card must be dealt with. This, of course, requires that multiple screws must be removed and then be reinserted. Each fine this task is carried out, there is the potential for dropping one or more of the individual retaining screws into the computer system. Additionally, when the computer system is being analyzed for a problem, it is often necessary to remove all of the expansion cards to isolate the problem. This requires the technician or computer owner to remove and reinstall all of the individual retaining screws (a process that may have to be repeated several fines during the problem analysis process), thereby further increasing the possibility that one or more screws will be dropped into the interior of the computer system.

To deal with the inconvenience posed by the above discussed conventional attachment system, a system that uses a single bar laid across the top flanges of all of the brackets held down by a single screw has been developed, such as the device disclosed in U.S. Pat. No. 5,317,483 which is incorporated herein by reference. The device disclosed in U.S. Pat. No. 5,317,483 is a substantial improvement over other prior art devices in that it eliminates the plurality of screws involved in the conventional systems. With only one screw being present, only one screw must be removed to remove one or more of the brackets. This, of course, reduces the amount of time spent in the manufacturing process to attach the blank brackets or expansion cards and also decreases the amount of aggravation for the computer user who adds or removes additional expansion cards or blanket brackets after the purchase of the computer. While this system has certainly improved the conventional problem of dealing with a multiplicity of screws it does not address fully the problem which remains; that is the problem associated with the fact that when the cross bar is removed the blank brackets have very little support to stay in their proper position. As such, they have a tendency to fall off during the manufacturing process and during the repair or expansion operations.

Other devices similar to the device disclosed in U.S. Pat. No. 5,317,483 are also known. These other devices also include an elongated bar having gripping members extending perpendicularly from the opposite ends of the elongated bar to form a "U" shape. The device is hinged via bent tabs extending from the back of the device through openings formed in the computer chassis wall. The elongated bar member lays across one or more card guides that have been positioned on the upper ledge of the card cage, and the gripping members engage openings in the side edges of the card cage to hold the card guides about the card cage. While this device eliminates the use of screws completely, it too suffers from the disadvantages. For example, two hands must be used to simultaneously disengage the gripping members from the openings. Additionally, once the bar is removed, all of the card guides are susceptible to falling off. This is particularly true where the card guides are blank card guides.

Accordingly, there is a need in the art for an improved apparatus for removably retaining expansion cards in an associated support cage structure in order to eliminate or at least substantially minimize the above-mentioned problems associated with the conventional use of individual card bracket tab retaining screws and cross bars. The present invention address these needs.

SUMMARY OF THE INVENTION

To address the above-discussed deficiencies of the prior art, the present invention provides, in a computer chassis having a wall, an interiorly-positioned card cage associated with the wall, and the card cage having a card guide slot therein, a card guide retaining device. In a preferred embodiment, the card guide retaining device comprises a retainer having (a) a first end extending to within the chassis through a retainer aperture in the wall, the retainer aperture corresponding to the card guide slot, and (b) a second end extending to without the retainer aperture exterior to the chassis. Preferably, the retainer is comprised of either a metalized plastic material, plastic or metal The first end includes a gripping surface to engage and retain a card guide positioned about the card guide slot.

Preferably, the gripping surface is comprised of a generally rectangular planar member extendable over a retaining tab portion of the card guide to thereby secure the card guide against a card guide ledge of the card cage. More preferably, however, the gripping surface further includes a securing tab depending transversely from the first end and extendable over a length of a card guide extending perpendicular to the retaining tab portion. The second end has a flanged portion to contact an exterior surface of the wall.

In a preferred embodiment, the flanged portion includes an actuating tab that extends transversely to the ranged portion. The retainer may be moved between an engaged position and a disengaged position from the exterior of the chassis via the ranged portion. The retainer is configured to provide a retaining force from the wall to the card guide when in the engaged position.

In another aspect of the above described embodiment, the retainer further includes an intermediate section extending between the first end and the second end. Preferably, the intermediate section includes a locking notch immediately adjacent the second end configured to releasably engage the wall adjacent the retainer aperture to thereby releasably lock the card guide retaining device in the engaged position.

In yet another aspect of the above described embodiment, intermediate section is an arcuate intermediate section transverse to the first and second ends and having a pivoting structure extending transverse to the arcuate intermediate section. The pivoting structure is engageable against the wall to provide a point about which the retainer may be pivoted from the engaged position to the disengaged position.

In yet another aspect of the present invention, the chassis wall has a plurality of spaced apart apertures adjacent the card cage in which each of the plurality of the retainer apertures correspond to a single card guide slot. As such, each aperture receives therethrough a retainer. With each of the retainers configured to hold and retain a single card guide, a single card guide may be removed or inserted while the remaining card guides are retained by other retainers.

In another embodiment, there is provide a computer chassis having a card guide retaining device associated therewith. The computer chassis comprises a wall having a retainer aperture and a card cage associated with the wall and positioned within the chassis adjacent the retainer aperture. The card cage has a card guide slot therein corresponding to the retainer aperture and a card guide ledge for supporting a card guide. The computer chassis further includes a retainer having (a) a first end extending to within the chassis through the retainer aperture, and (b) a second end extending to without the retainer aperture exterior to the chassis. The retainer is preferably comprised of either a metalized plastic, a plastic or a metal. The first end includes a gripping surface to engage and retain the card guide positioned about the card guide slot. Preferably, the gripping surface is comprised of a generally rectangular planar member extendable over a retaining tab portion of the card guide to thereby secure the card guide against the card guide ledge. More preferably, however, the gripping surface further includes a securing tab depending transversely from the first end and extendable over a length of a card guide extending perpendicular to the retaining tab portion. The second end has a flanged portion to contact an exterior surface of the wall, and preferably includes an actuating tab that extends transversely to the flanged portion. The retainer is movable between an engaged position and a disengaged position exterior to the chassis, and is preferably configured to provide a retaining force from the wall to the card guide when in the engaged position.

In another aspect of the above described embodiment, the retainer further includes an intermediate section extending between the first end and the second end. Preferably, the intermediate section includes a locking notch immediately adjacent the second end configured to releasably engage the wall adjacent the retainer aperture to thereby releasably lock the card guide retaining device in the engaged position. The locking notch is preferably engageable against locking projections that extend inwardly from the wall of the chassis adjacent the retainer aperture. The locking projections are cooperable with the locking notch to securely hold the retainer in the engaged position.

In yet another aspect of the above described embodiment, the intermediate section is an arcuate intermediate section transverse to the first and second ends and having a pivoting structure extending transverse to the arcuate intermediate section. The pivoting structure is engageable against the wall to provide a point about which the retainer may be pivoted from the engaged position to the disengaged position.

In yet another aspect of this embodiment, the chassis wall has a plurality of spaced apart apertures adjacent the card cage in which each of the plurality of the retainer apertures correspond to a single card guide slot. As such, each aperture receives therethrough a retainer. With each of the retainers configured to hold and retain a single card guide, a single card guide may be removed or inserted while the remaining card guides are retained by other retainers.

In yet another aspect of the present invention, there is provided a method for positioning a card guide in a card cage. The card cage has a card guide ledge and a card guide slot therein and is positioned in a computer chassis having a wall with a retainer aperture corresponding to the card guide slot. The method comprises the steps of placing a card guide on the card guide ledge, grasping a flanged portion of a second end of a retainer extending to without the retainer aperture, moving the retainer within the retainer aperture from a disengaged position toward an engaged position, and engaging a gripping surface of a first end of the retainer against the card guide and retaining the card guide about the card guide slot. When the retainer is in the engaged position, the first end extends to within the chassis through the retainer aperture in the wall, thereby providing a retaining force against the card guide slot from the wall to the card guide via the retainer. Preferably, the step of grasping includes the step of grasping an actuating tab extending transversely to the flanged portion.

In another aspect of this particular embodiment, the gripping step includes the step of extending a generally rectangular planar member of the retainer over a retaining tab portion of the card guide to thereby secure the card guide against a card guide ledge of the card cage. Preferably, the gripping step includes extending a securing tab depending transversely from the first end over a length of a card guide that extends perpendicular to the retaining tab portion.

In another aspect of the method, the step of moving the retainer includes the step of moving an arcuate intermediate section extending between the first end and the second end through the retainer aperture.

In yet another aspect of the method, the intermediate section is an arcuate intermediate section and the moving step includes pivoting the retainer about a pivoting structure extending transverse to the arcuate intermediate section that is engaged against the wall. Preferably, the moving step includes engaging a locking notch against the wall adjacent the retainer aperture and releasably locking the card guide retaining device in the engaged position. The locking notch is preferably formed in the intermediate section immediately adjacent the second end. The step of engaging the locking notch preferably includes engaging the locking notch against locking projections extending inwardly from the wall.

In yet another aspect, the method the step of placing includes the steps of sequentially placing a plurality of card guides on the card guide ledge; the step of gasping includes the steps of sequentially grasping a plurality of flanged portions of a second end of a plurality of retainers extending to without a plurality of the retainer apertures; the step of moving includes the step of sequentially moving a plurality of the retainers within the plurality of apertures from a disengaged position toward an engaged position; and the step of engaging a gripping surface includes the step of sequentially engaging a plurality of gripping surface of a first end of the plurality of retainers against the plurality of the card guide and retaining the card guide about the card guide slots.

In yet another aspect of the method, the step of moving includes the step of displacing a retainer composed of a material selected from the group consisting of a metalized plastic material, a plastic material, and a metal.

In yet another aspect of the present invention, there is provided a method of manufacturing a computer chassis having a card guide retaining device associated therewith. The method comprises the steps of: (1) forming a computer chassis having a computer chassis wall; and (2) forming a retainer aperture in the computer chassis wall, the retainer aperture configured to receive therein a retainer for holding a card guide about a card cage positioned within an interior of the computer chassis.

In another aspect of the method of manufacture, the method further comprises the steps of (1) securing a card cage having a card guide slot formed therein to an interior side of the wall adjacent the retainer aperture such that a position of the retainer aperture corresponds to a position of the card guide slot; and (2) inserting a retainer into the retainer aperture, the retainer having (a) a first end extending to within the computer chassis through the retainer aperture, and (b) a second end extending to without the retainer aperture exterior to the computer chassis, the first end including a gripping surface to engage and retain a card guide positioned about the card guide slot, the second end having a ranged portion to contact an exterior surface of the wall.

In yet another aspect, the method of manufacture further comprises the steps of placing a card guide about the card guide slot and engaging the retainer against the card guide to retain and hold the card guide about the card guide slot.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
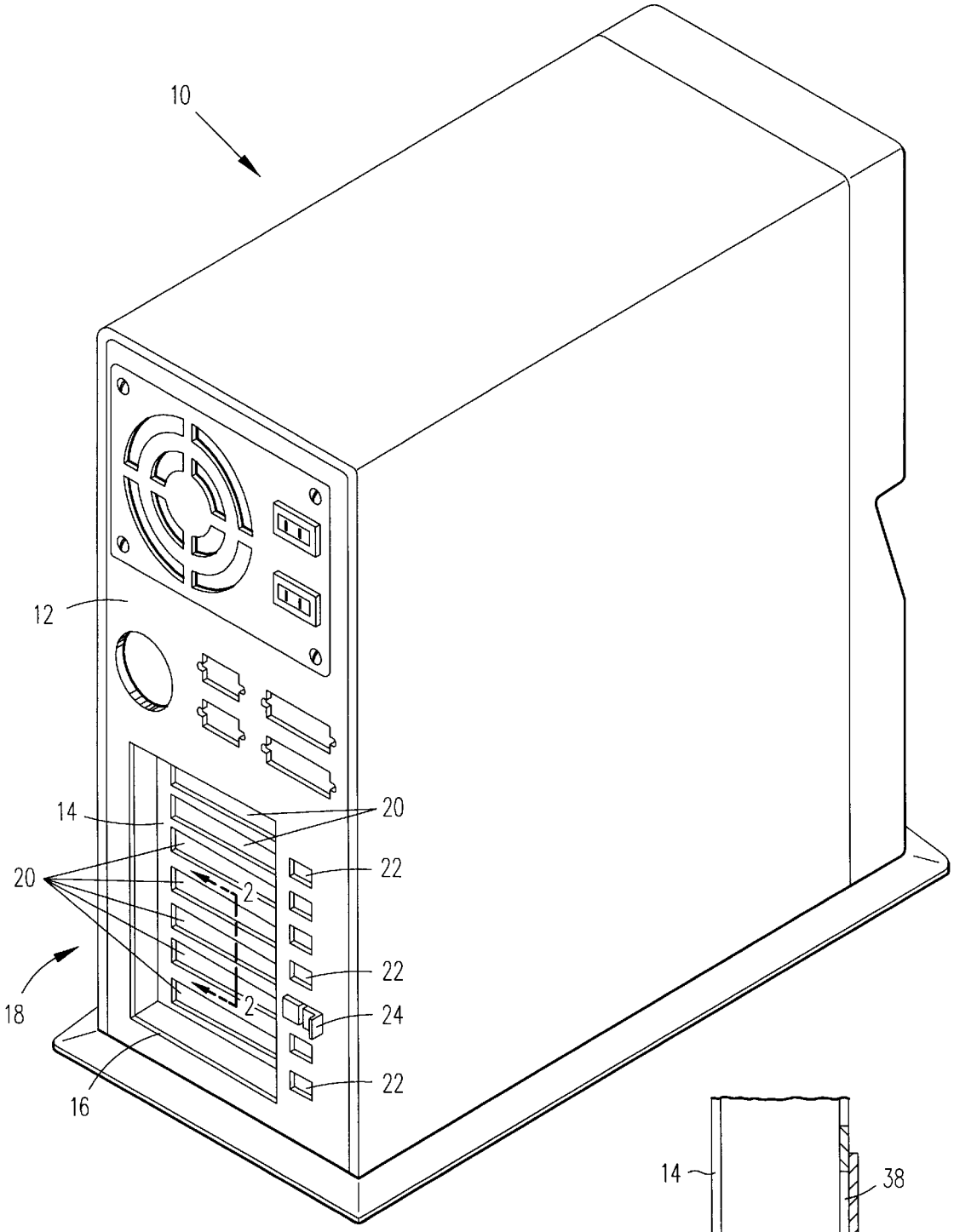
FIG. 1 illustrates a perspective isometric rear end view of a computer chassis and the card guide retaining device of the present invention.

Referring initially to FIG. 1, in a preferred embodiment thereof, there is illustrated a perspective isometric view of a computer chassis 10 of the present invention. While the computer chassis 10 shown is a "tower" model it will, of course, be appreciated that the computer chassis 10 could be other designs as well. The computer chassis 10 has a wall 12 and a card cage 14 of conventional design that is received within a card cage opening 16 formed in the wall 12 preferably near a rear end 18 of the computer chassis 10. The card cage 14 is positioned within the computer chassis 10 and has formed therein rectangularly shaped card guide slots 20, which are accessible through the card cage opening 16. Formed in the wall 12 and adjacent the card cage 14 are retainer apertures 22 that are configured to receive a retainer 24 therein. While a plurality is illustrated, it, of course, will be appreciated that there may be only one such retainer aperture and retainer member if so desired.

Figure 2:
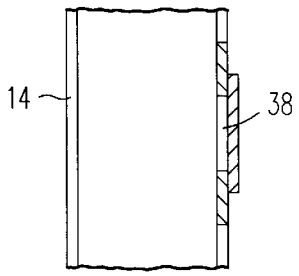
FIG. 2 illustrates a cross sectional view of the card cage in FIG. 1 taken along the line 2—2.
Figure 3:
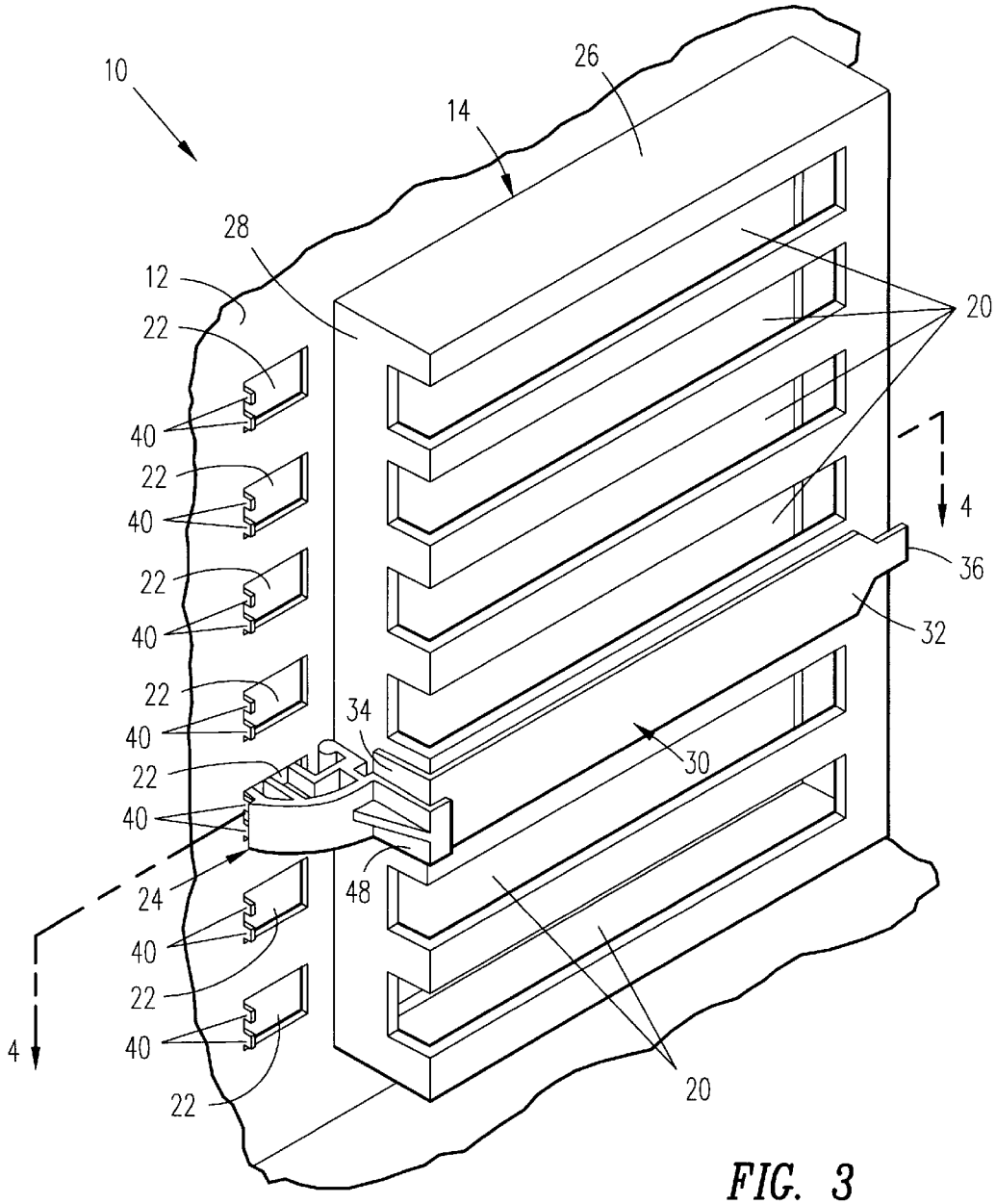
FIG. 3 illustrates a perspective isometric view of the card cage, the retainer apertures in the chassis wall and the retainer of the present invention in an engaged position against a card guide.

Turning now to FIGS. 2 and 3, the card cage 14 and the retainer 24 are illustrated from an interior view within the computer chassis 10. As illustrated in FIG. 3, the card cage 14 is preferably of conventional design and is comprised of a generally rectangular frame 26 having a card guide ledge 28 formed on an end of the frame 26. In FIG. 3, the card cage 14 and retainer 24 are shown with the retainer 24 received through one of the retainer apertures 22 and in the engaged position to hold and retain a card guide 30 about the card guide slot 20. The card guide 30 is preferably of conventional design and is comprised of a generally rectangular, flat, elongated body member 32 having a retaining tab portion 34 that is transverse to the elongated body member 32 foraged on one end and an insertion tab 36 formed on the opposite end of the elongated body member 32. While the card guide 30 that is shown is a "blank" card guide (i.e. no expansion card is attached), it should be understood that a card guide having an expansion card associated therewith could also be used in conjunction with the present invention. Thus, as used herein, the phrase "card guide" includes both blank card guides or card guides associated with conventional expansion cards.

As illustrated in FIG. 3, the retaining tab portion 34 is configured to lay over the card guide ledge 28 and about the card guide slot 20 with the insertion tab 36 being received in an insertion tab slot 38 (FIG. 2) adjacent the opposite side of the card cage 14. The card guide 30 is retained and held in position by the retainer 24 that is received through the retainer aperture 22 formed in the wall 12 of the computer chassis 10.

In a preferred embodiment, locking projections 40 extend inwardly from the wall 12 and adjacent the retainer aperture 22 to cooperate with and releasably lock the retainer 24 in the engaged position in a manner hereinafter described. Additionally illustrated, are a plurality of the retainer apertures 22 formed in the wall 12 of the computer chassis 10, each of which is configured to receive therethrough a single retainer 24. Each aperture 22 corresponds in position to a card guide slot 20 in the card cage 14 in the manner shown. Thus, as illustrated, one aspect of the present invention provides for a plurality of retainers 22 holding a plurality of card guides 30.

Figure 4:
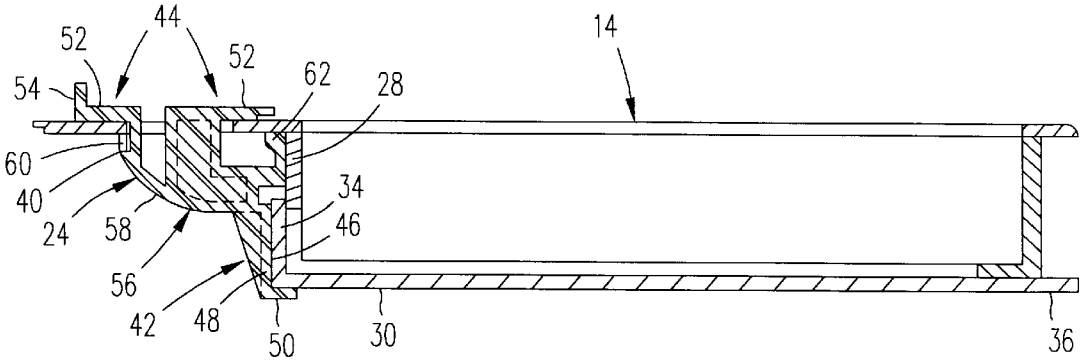
FIG. 4 illustrates a cross sectional view of FIG. 3 taken along the line 4—4.
Figure 5:
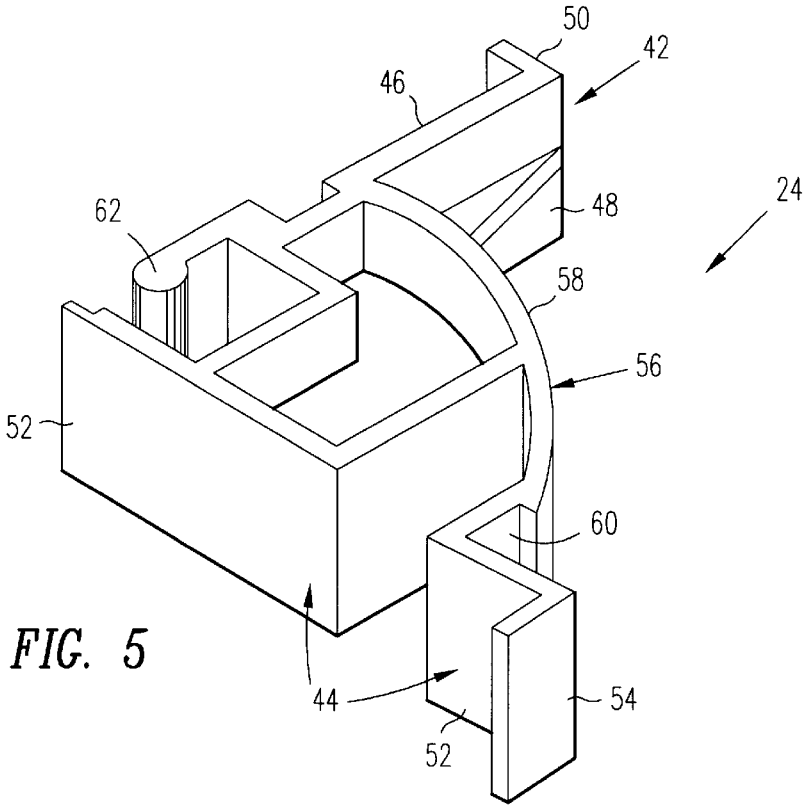
FIG. 5 illustrates a perspective isometric view of the retainer of the present invention.

Turning now to FIGS. 4 and 5, there is shown a cross-sectional view of FIG. 3 taken along the line 4—4 illustrating the retainer 24 in the engaged position and holding the card guide 30 about the card guide slot 20. The retainer 24 provides a simple yet effective retainer 24 that offers distinct advantages over the devices of the prior art. For instance, the retainer 24 may be actuated from the exterior of the computer chassis 10, and since each retainer 24 holds a single card guide 30, card guides can be inserted and removed without the problem of having other card guides following off the card cage 14. In addition, the present invention does not require the use of a tool to fasten the card guide 30 to the card cage 14, thereby providing a more efficient, quicker and easier way of inserting and removing a card guide 30 from the card cage 14.

Continuing to refer to the preferred embodiment illustrated in FIGS. 4 and 5, the retainer 24 has a first end 42 extending to within the computer chassis 10 through the retainer aperture 22 and a second end 44 extending to without the retainer aperture 22 exterior to the computer chassis 10. The first end 42 includes a gripping surface 46 configured to engage and retain the card guide 30. Preferably, the gripping surface 46 is comprised of a generally rectangular planar member 48 that is extendable over the retaining tab portion 34 of the card guide 30. More preferably, however, the gripping surface 46 further includes a securing tab 50 depending transversely from the first end 42. When the retainer 24 is in an engaged position, the securing tab 50 extends over a length of the elongated body 32 of the card guide 30 to thereby securely hold the card guide 30 about the card guide slot 20.

The second end 44 has a flanged portion 52 that contacts the exterior surface of the wall 12 when the retainer 24 is in the engaged position. Preferably, the flanged portion 52 includes an actuating tab 54 that extends transversely to the flanged portion 52. The actuating tab 54 extends outwardly from the exterior of the wall 12 and is configured such that it may be easily grasped from an exterior of the computer chassis 10 to move the retainer 24 between the engaged position and disengaged position.

In another aspect of the preferred embodiment shown in FIGS. 4 and 5, the retainer 24 further includes an intermediate section 56 that extends between the first end 42 and the second end 44. Preferably, the intermediate section 56 of the retainer 24 is an elongated body member. More preferably, however, the intermediate section 56 is an arcuate intermediate section 58 that is transverse to the first and second ends 42, 44. In one particular embodiment, the intermediate section 56 includes a locking notch 60 that is formed immediately adjacent the second end 44 and is configured to releasably engage the wall 12 adjacent the retainer aperture 22 to releasably lock the retainer 24 in the engaged position. In yet another embodiment, the computer chassis 10 preferably has the locking projections 40 extending inwardly from the wall 12 adjacent the retainer aperture 22. As the retainer 24 is moved to the engaged position, the locking projections 40 snap down into and engage a side edge of the locking notch 60. This releasably secures the retainer 24 in the engaged position. The locking projections 40 may be disengaged by pushing downwardly on the actuating tab 54 and then rotating the retainer 24 outwardly from the wall 12 of the computer chassis 10. In those embodiments where the locking projections 40 are not present, the locking notch 60 is configured to releasably and securely engage against the interior side of the wall 12. In such instances, the width of the locking notch 60 is preferably narrower so that the edge of the locking notch 60 will engage the wail 12 when the retainer 24 is in the engaged position.

In yet another preferred embodiment, the retainer 24 also includes a pivoting structure 62 extending traverse to the arcuate intermediate section 58. The pivoting structure 62 is engageable against the interior side of the wall 12 to provide a point about which the retainer 24 can be pivoted from the engaged position to the disengaged position. Preferably, the pivoting structure 62 is an elongated cylindrically shaped portion of the retainer 24 that is integrally formed with the retainer 24. The retainer 24 is preferably comprised of a metalized plastic (e.g. a plastic that contains bits of metal or a plastic that is sputter coated with a metal), a plastic or a metal. Preferably, the retainer 24 is comprised of a material that will minimize electromagnetic interference generated within the computer chassis 10.

Figure 6:
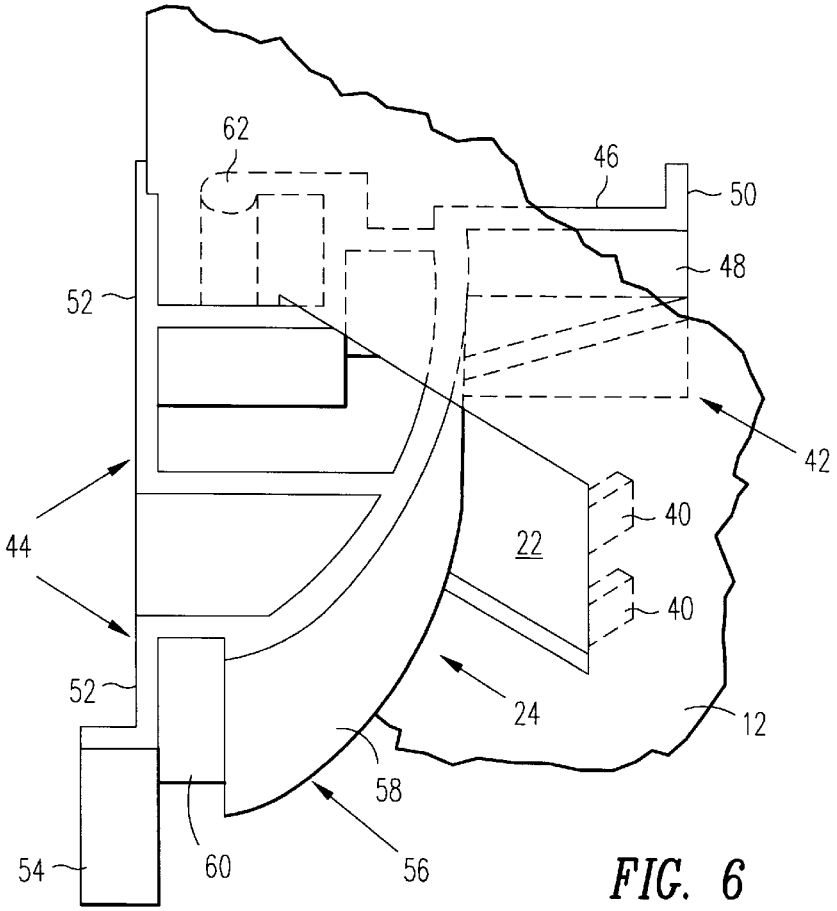
FIG. 6 illustrates a cut-away view of the computer chassis showing one of the retainers in a pivoted disengaged position wherein the retainer is released from the card guide.

Referring now to FIG. 6, there is illustrated a cut-away view of the computer chassis showing one of the retainers in a pivoted disengaged position wherein the retainer is released from the card guide. As illustrated in the preferred embodiment, the retainer 24 is pivotable within the retainer aperture 22 about the pivoting structure 62. The arcuate intermediate section 58 and the pivoting structure 62 combine to produce a retainer 24 that can easily be rotated within the retainer aperture 22.

With a detailed description having been set forth, a method of making and using the present invention will now be discussed with general reference to FIGS. 1–6. A computer chassis having a wall is formed using conventional methods of manufacture. Preferably, once the wall is formed, a unique retainer aperture is formed in the wall. If the computer chassis is comprised of metal, the retainer aperture may be formed by stamp cutting the retainer aperture in the wall; it may be molded in the wall where the computer chassis is plastic; or other methods known to form apertures in a chassis wall. A plurality of retainer apertures may be formed in the wall by either method if so desired.

A card cage of conventional design that has a card guide slot formed therein is securely attached to an interior surface of the wall adjacent the retainer aperture such that a position of the card guide slot corresponds to a position of the retainer aperture. In other words, the card guide slot preferably aligns with the retainer aperture so that a retainer, which is inserted in the retainer aperture can be operatively engaged against the card guide slot. Where a plurality of retainer apertures are present, each aperture receives a single retainer therein and each retainer aperture corresponds to each card guide slot. The retainer is operatively inserted in the retainer aperture such that the first end extends to within the computer chassis and the second end extends from without the chassis. More specifically, when in a disengaged position, the first end contacts the interior side of the wall and the intermediate section extends from without the computer chassis as shown in FIG. 6. The retaining tab portion of the card guide is placed on the card guide ledge and the retainer is then moved to and engaged position in a preferred manner which will now be described.

With the retainer in the disengaged position, the actuating tab that is transverse to the second end is grasped, and the retainer is pivoted about the pivoting structure to an engaged position. As the retainer is being pivoted, the arcuate intermediate section rotates through the retainer aperture to within the computer chassis causing the gripping surface of the first end of the retainer to engage the retaining tab portion of the card guide. As the retainer is rotated further, the securing tab that depends transversely from the first end engages and extends over a length of the elongated body of the card guide. When the securing tab and gripping surface are in full contact with the card guide, the retainer is configured such that the locking projections that extend from the wall of the computer chassis snap down into the locking notch formed in the arcuate intermediate section, which is adjacent the second end, thereby releasably locking the retainer in an engaged position. When a plurality of retainers, retainer apertures and card guides are included with the computer chassis, this procedure is sequentially repeated for each card guide and retainer.

To disengage the retainer, the actuating tab is grasped and sufficient force, which is transverse to the locking projections, is applied to disengage the locking projections from the locking notch. As the retainer is pivoted outwardly from the computer chassis, the securing tab and the gripping surface disengage from the card guide and the arcuate intermediate section rotates to a position outside the computer chassis. The card guide can then be removed from about the card guide slot. If a plurality of retainers are present, each retainer is sequentially disengaged from the card guide in the manner just discussed.

From the above description, it is apparent that the present invention provides, in a computer chassis having a wall an interiorly-positioned card cage associated with the walk and the card cage having a card guide slot therein, a card guide retaining device. In a preferred embodiment, the card guide retaining device comprises a retainer having (a) a first end extending to within the chassis through a retainer aperture in the wall, the retainer aperture corresponding to the card guide slot, and (b) a second end extending to without the retainer aperture exterior to the chassis. Preferably, the retainer is comprised of either a metalized plastic material plastic or metal. The first end includes a gripping surface to engage and retain a card guide positioned about the card guide slot. Preferably, the gripping surface is comprised of a generally rectangular planar member extendable over a retaining tab portion of the card guide to thereby secure the card guide against a card guide ledge of the card cage. More preferably, however, the gripping surface further includes a securing tab depending transversely from the first end and extendable over a length of a card guide extending perpendicular to the retaining tab portion. The second end has a flanged portion to contact an exterior surface of the wall. The flanged portion preferably includes an actuating tab that extends transversely to the flanged portion. The retainer may be moved between an engaged position and a disengaged position from the exterior of the chassis via the ranged portion. The retainer is configured to provide a retaining force from the wall to the card guide when in the engaged position.

Although the present invention and its advantages have been described in detail, those skilled in the art should understand that they can make various changes, substitutions and alterations herein without departing from the spirit and scope of the invention in its broadest form.

What is claimed is:

1. A card guide retaining device in combination with a computer chassis having a wall and an interiorly-positioned card cage associated with said wall, said card cage having a card guide slot therein, said card guide retaining device comprising:

a retainer having a first end extending to within said computer chassis through a retainer aperture in said wall, said retainer aperture corresponding to said card guide slot[,]*;* and a second end extending out from said retainer aperture exterior to said computer chassis, said first end including a gripping surface to engage and retain a card guide positioned about said card guide slot, [said second end having a flanged portion to contact an exterior surface of said wall,] said retainer movable between an engaged position and a disengaged position from an exterior of *the* computer chassis, said retainer configured to provide a retaining force from said wall to said card guide when in said engaged position.

2. The card guide retaining device of claim 1 wherein said gripping surface is comprised of a generally rectangular planar member extendable over a retaining tab portion of said card guide to thereby secure said card guide against a card guide ledge of said card cage.

3. The card guide retaining device of claim 2 wherein said gripping surface further includes a securing tab depending transversely from said first end and extendable over a length of [a] *said* card guide extending perpendicular to said retaining tab portion.

4. The card guide retaining device of claim 1 wherein said retainer includes an intermediate section extending between said first and second ends, said intermediate section having *a* locking notch formed therein immediately adjacent said second end configured to releasably engage said wall adjacent said retainer aperture to thereby releasably lock said retainer in said engaged position.

5. The card guide retaining device of claim 4 wherein said intermediate section is an arcuate intermediate section extending between said first end and said second end, said arcuate intermediate section being transverse to said first and second ends.

6. The card guide retaining device of claim 5 wherein said retainer further comprises a pivoting structure extending transverse to said arcuate intermediate section, said pivoting structure engageable against said wall to provide a point about which said retainer is pivoted from said engaged position to said disengaged position.

7. The card guide retaining device of claim 1 wherein said [flanged portion] *second end* includes an actuating tab that extends [transversely to said flanged portion] *therefrom*.

8. The card guide retaining device of claim 1 wherein said retainer is comprised *of* a metalized material.

9. The card guide retaining device of claim 1 wherein said retainer consists from the group of a plastic material or metal material.

10. The card guide retaining device of claim 1 wherein said wall has a plurality of spaced apart *retainer* apertures adjacent said card cage, each of said plurality of said retainer apertures corresponding to a single card guide slot and receiving therethrough one of said retainers, each of said retainers configured to hold and retain a single card guide, to thereby allow removal or insertion of a single card guide while remaining card guides are retained by other retainers.

11. A computer chassis comprising:

a wall having a retainer aperture and a card cage associated with said wall and positioned within said computer chassis adjacent said retainer aperture, said card cage having a card guide slot therein corresponding to said retainer aperture and a card guide ledge for supporting a card guide; and a retainer having (a) a first end extending to within said computer chassis through said retainer aperture, and (b) a second end extending out from said retainer aperture exterior to said computer chassis, said first end including a gripping surface to engage and retain said card guide positioned about said card guide slot, [said second end having a ranged portion to contact an exterior surface of said wall,] said retainer movable between an engaged position and a disengaged position exterior to said computer chassis, said retainer configured to provide a retaining force from said wall to said card guide when in said engaged position.

12. The computer chassis of claim 11 wherein said gripping surface is comprised of a generally rectangular planar member extendable over a retaining tab portion of said card guide to thereby secure said card guide against said card guide ledge.

13. The computer chassis of claim 12 wherein said gripping surface further includes a securing tab depending transversely from said first end and extendable over a length of [a] *said* card guide extending perpendicular to said retaining tab portion.

14. The computer chassis of claim 11 wherein said retainer further includes an intermediate section extending between said first end and said second end, said intermediate section having a locking notch formed therein immediately adjacent said second end configured to releasably engage said wall adjacent said retainer aperture to thereby releasably lock said retainer in said engaged position.

15. The computer chassis of claim 14 wherein said intermediate section is an arcuate intermediate section extending between said first end and said second end, said arcuate intermediate section being transverse to said first and second ends.

16. The computer chassis of claim 15 wherein said retainer further comprises a pivoting structure extending transverse to said arcuate intermediate section, said pivoting structure engageable against said wall to provide a point about which said retainer is pivoted from said engaged position to said disengaged position.

17. The computer chassis of claim 16 wherein said wall has locking projections extending inwardly therefrom adjacent said retainer aperture, said locking projections cooperable with said locking notch to securely hold said retainer in said engaged position.

18. The computer chassis of claim 11 wherein said [flanged portion] *second end* includes an actuating tab that extends [transversely to said flanged portion] *therefrom*.

19. The computer chassis of claim 11 wherein said retainer consists from the group of a metalized material, plastic material, or metal material.

20. The computer chassis of claim 11 wherein said wall has a plurality of spaced apart *retainer* apertures adjacent said card cage, each of said plurality of said retainer apertures corresponding to a single card guide slot and receiving therethrough one of said retainers, each of said retainers configured to hold and retain a single card guide, to thereby allow removal or insertion of a single card guide while remaining card guides are retained by other retainers.

* * * * *